United States Patent
Fender et al.

(10) Patent No.: US 11,468,064 B2
(45) Date of Patent: Oct. 11, 2022

(54) METHODS FOR SUBSTITUTING A SEMI-JOIN OPERATOR WITH ALTERNATIVE EXECUTION STRATEGIES AND SELECTION METHODS TO CHOOSE THE MOST EFFICIENT SOLUTION UNDER DIFFERENT PLANS

(71) Applicant: Oracle International Corporation, Redwood Shores, CA (US)

(72) Inventors: Pit Fender, Union City, CA (US); Benjamin Schlegel, Merced, CA (US); Matthias Brantner, Sunnyvale, CA (US); Cagri Balkesen, Zurich (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 347 days.

(21) Appl. No.: 16/394,998

(22) Filed: Apr. 25, 2019

(65) Prior Publication Data
US 2020/0341981 A1    Oct. 29, 2020

(51) Int. Cl.
*G06F 16/2453* (2019.01)
*G06F 16/248* (2019.01)
*G06F 16/2455* (2019.01)

(52) U.S. Cl.
CPC ...... *G06F 16/24544* (2019.01); *G06F 16/248* (2019.01); *G06F 16/2456* (2019.01)

(58) Field of Classification Search
CPC .......... G06F 16/24544; G06F 16/2456; G06F 16/248
See application file for complete search history.

(56) References Cited

U.S. PATENT DOCUMENTS

| | | | |
|---|---|---|---|
| 5,761,657 A | 6/1998 | Hoang | |
| 6,032,143 A | 2/2000 | Leung et al. | |
| 6,032,144 A | 2/2000 | Srivastava et al. | |
| 6,449,609 B1* | 9/2002 | Witkowski | G06F 16/24537 |
| 6,496,819 B1* | 12/2002 | Bello | G06F 16/24537 |
| 2004/0205078 A1* | 10/2004 | Galindo-Legaria | G06F 16/2456 |
| 2011/0055199 A1* | 3/2011 | Siddiqui | G06F 16/2456 707/714 |
| 2014/0067789 A1 | 3/2014 | Ahmed et al. | |
| 2014/0172850 A1* | 6/2014 | Borkar | G06F 16/28 707/736 |

(Continued)

FOREIGN PATENT DOCUMENTS

CN    104408134    3/2015

OTHER PUBLICATIONS

R. Lyseng, "Some news on the MySQL optimizer", available: http://roylyseng.blogspot.in/2012/04/semi-join-in-mysql-56.html, Apr. 10, 2012.

(Continued)

*Primary Examiner* — Grace Park
(74) *Attorney, Agent, or Firm* — Hickman Becker Bingham Ledesma LLP

(57) ABSTRACT

The manner in which tables are joined can affect the outcome of the query and database performance. Example types of join operations include semi-join and inner-join. The techniques described herein are approaches that may be used to substitute a semi-join operator with an inner-join operator and may be used to transform and optimize representations of queries.

18 Claims, 14 Drawing Sheets

(56) References Cited

U.S. PATENT DOCUMENTS

2015/0379077 A1* 12/2015 Grosse .............. G06F 16/24542
707/718

OTHER PUBLICATIONS

Quassnoi, "Explain Extended ; How to create fast database queries= In vs. Join vs. Exists: Oracle", available: https://explainextended.com/2009/09/30/in-vs-join-vs-exists-oracle/, Sep. 30, 2009.
Burleson, D.K., "The Semi-Join", available: http://www.remote-dba.net/t_op_sql_semijoin.htm, Nov. 21, 2018.
"Convert Where In sub-query to an inner join", available: http://stackoverflow.com/questions/7823091/convert-where-in-sub-query-to-an-inner-join, Nov. 21, 2018.

* cited by examiner

FIG. 2

Table 210

| C1 | C2 |
|----|----|
| 1  | 1  |
| 2  | 2  |
| 2  | 3  |
| 2  | 4  |

Table 200

| C1 | C2 |
|----|----|
| 1  | 1  |
| 1  | 2  |
| 2  | 1  |

METHODS FOR SUBSTITUTING A SEMI-JOIN OPERATOR WITH ALTERNATIVE EXECUTION STRATEGIES AND SELECTION METHODS TO CHOOSE THE MOST EFFICIENT SOLUTION UNDER DIFFERENT PLANS

CROSS-REFERENCE TO RELATED APPLICATIONS

This application is related to U.S. application. Ser. No. 10/874,400, filed Jun. 22, 2004, entitled "Multi-Tier Query Optimization"; U.S. application Ser. No. 11/716,126, filed Mar. 8, 2007, entitled "Efficient Interaction Among Cost-Based Transformations"; U.S. Application No. 60/782,785, filed Mar. 15, 2006, entitled "Cost Based Query Transformation—Join Factorization and Group by Placement"; U.S. application Ser. No. 11/716,107, filed Mar. 8, 2007, entitled "Efficient Search Space Analysis for Join Factorization". The entire contents for each of which is hereby incorporated by reference as if fully set forth herein.

FIELD OF THE TECHNOLOGY

The present invention relates to the field of database system, and in particular to substituting a semi-join operator with alternative execution strategies and transforming and optimizing representations of queries.

BACKGROUND

Query Processing

A query is an expression, command, or set of commands that, when executed, causes a database management system (DBMS) to perform operation(s) on a set of data. The operation(s) may select, group, order, filter, or otherwise process data, and the processed data may be returned as part of a result set. The query may include join predicates that filter the data by placing conditions on the data that is to be included as part of the result set. One example query language is structured query language ("SQL"), but other query languages also exist and function similarly. In a SQL query, filter join predicates may be specified in a WHERE clause.

The query, including the filter join predicates, may have been authored by a user, by an application, by a combination of a user and an application, or as a result of rewrites based on a query rewrite technique applied on the query authored by the user or the application.

Query operations for executing a query may be processed in a predictable order by a DBMS. For example, the order of precedence for a SQL query may be FROM, WHERE, GROUP BY, HAVING, SELECT, and ORDER BY. DBMS may vary the order if varying the order is predicted to be more efficient as long as the varying the order would not change a result of the query.

Conditions in filter join predicates may be related to each other with logical operators such as AND (for "conjunctive join predicates") or OR (for "disjunctive join predicates"). The join predicates may also include sub-queries that require evaluation of separate select statements and may include further sub-queries. To produce a single row of a result set for an outer query, a DBMS may store and arrange temporary data generated by sub-quer(ies) of the outer query, and the execution engine may use that data to determine what should be included in the single row of the result set. Such a process may be repeated to produce each row of the outer query. Queries with multiple join predicates and one or more layers of sub-queries that are executed on large datasets may take a significant amount of computing resources (i.e., processor time and memory) to compute.

Queries and/or sub-queries may cause the DBMS to perform join operations such that individual rows of the result set are based on or conditioned on data from multiple relations, such as tables, views, or snapshots. In SQL queries, a join operation may be performed whenever multiple tables ("base or view tables") appear in a FROM clause of a query. For some join operations, the first table in the join operation may be called the "left table," and the second table in the join operation may be called the "right table." The join operation produces a result set that may be stored temporarily, used in evaluating other queries, or written as a new table in a database. The result set may often be stored temporarily so that other parts of the query may select, organize, or filter data from the result set.

In query optimization, a query rewrite technique may rewrite a representation of a query from one form to another form as long as the two forms are semantically equivalent to each other. The representation of the query may be the query expression itself or may be an internally and/or externally recognized representation of the query, such as a query execution tree or other data structure. If the representation does not include the query expression itself, the representation may include data that describes steps that may be taken to execute the query, such as an execution plan. An execution plan is a set of directives and metadata that is prepared for an execution engine. As used herein, a query representation is "rewritten" when (a) the representation represents a rewritten version of the query, after the query has been rewritten from a first version to a second version, (b) the representation is received in a manner that specifies a first set of operations, such as a first version or a first rewrite technique, and executed or caused to be executed using a second set of operations, such as the operations specified by a second version or second rewrite technique, or (c) received in a manner that specifies a first set of operations, and planned for execution using a second set of operations. Two representations of queries are semantically equivalent to each other when the two representations of queries, if executed, would produce equivalent result sets, even if the result sets are assembled in different manners by the two representations. Execution of a representation of a query is semantically equivalent to the representation of the query if the execution produces a result set that is equivalent to the one that would be produced by the representation of the query, if executed.

Join Operations

The manner in which tables are joined can affect the outcome of the query. Example types of join operations include semi-join (rows from the non-preserving table that match a condition based on the preserving table) and inner-join (rows from preserving and non-preserving tables after removal of non-matching rows from the preserving and non-preserving tables).

Example techniques of join include hash, sort-merge, index access, and nested-loops joins. The joining technique used for joining two tables does not affect the outcome of the query. The type of join operation may be specified in the FROM clause or in the WHERE clause of the query. The joining technique is generally left up to the query rewrite technique to determine possible rewrites based on rewrite rules or cost-analysis of the query.

An inner-join between preserving table T1 and non-preserving table T2 on join predicate P results in another table that is produced by combining row from two tables that match the join predicate P. Typically, the join predicate of an inner-join requires that a column from the preserving table match the value of a column in the non-preserving table. An example join predicate for a semi-join is "T1.a=T2.b," where "a" is any column of T1 and "b" is any column of T2. When evaluating an inner-join, every row in T1 is compared with every row of T2 to find all pairs of rows which satisfy the join predicate P. Column value for each matched pair of rows are combined into a result row.

A semi-join between preserving table T1 and non-preserving table T2 on join predicate P results in another table that includes the rows from T1 that match the join predicate P. Typically, the join predicate of a semi-join requires that a column from the preserving table match the value of a column in the non-preserving table. An example condition for a semi-join is "T1.a=T2.b," where "a" is any column of T1 and "b" is any column of T2. When evaluating a semi-join, rows from T1 that match the condition are added to the semi-join table, and rows from T1 that do not match the condition are not added to the semi-join table. Also excluded from the table are rows from T2. In the example, if a value "5" is in a current row of T1.a, then the current row is added to the semi-join table if "5" is in any row of T2.b.

A semi-join is a powerful and important type of join. Described herein are approaches for executing semi-joins more efficiently. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts an example related to the Post-Join Semi-Join Rewrite Technique, which involves a preserving table and a non-preserving table.

DETAILED DESCRIPTION

Figure 1A:
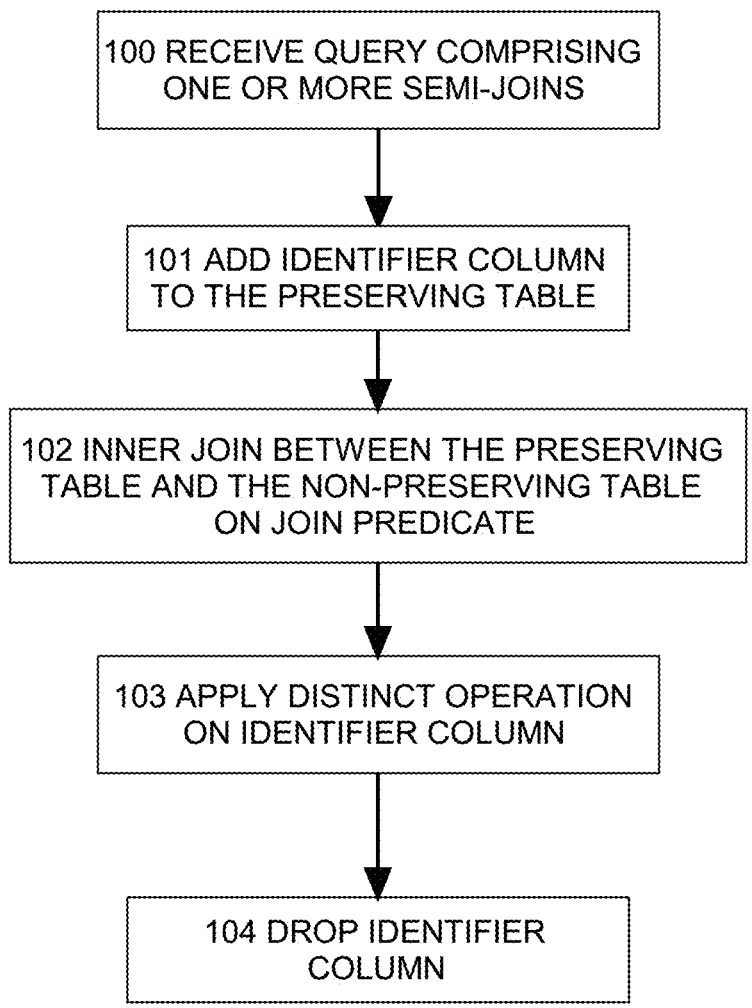
FIG. 1A is a block diagram illustrating the steps performed by a DBMS to perform the Post-Join Semi-Join Rewrite Technique.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As mentioned previously, in a DBMS, a semi-join between preserving table T1 and non-preserving table T2 on join predicate P results in another table that includes the rows from T1 that match the join predicate P. In many scenarios, portions of data retrieved from T1 may not be relevant to the execution of the operations. For example, assuming the cardinality |T2| of T2 is much smaller than the cardinality |T1| of T1, it would be more efficient to build a hash table for the P referenced attributes of T2 instead for those of T1. With a semi-join operation, this cannot be easily done since semi-joins are not freely re-orderable.

In a DBMS, an inner-join might be preferable over a semi-join since inner-joins are re-orderable. Thus, an inner-join operation may be used to substitute a semi-join operation to improve database performance.

One approach to rewrite a semi-join into an inner-join, herein referred to as the Semi-Join Substitution Technique, could be applied if two conditions are satisfied: (1) The join predicate P is an equality join predicate between one attribute in T1 and one attribute in T2, which can be denoted by $T1.C_X=T2.C_Y$. (2) The relationship between $C_X$ is in a referential constraint with $C_Y$ is a relationship, where $C_Y$ contains no duplicates values. One example would be a unique index on $C_Y$.

Another approach to rewrite a semi-join into an inner-join, herein referred to as the Pre-Join Semi-Join Rewrite Technique, could be applied if there are no duplicates in the inner relation T2 when projected on the attributes that are referenced in P. The Pre-Join Semi-Join Rewrite Technique uses a distinct operator to determine whether there are duplicates in the inner relation T2 when projected on the attributes that are referenced in P.

The Pre-Join Semi-Join Rewrite Technique and the Semi-Join Substitution Technique both have restrictions on join predicate P and can only apply to certain cases satisfied by the join predicate P.

Described herein are techniques for universal substitution of a semi-join with an inner-join and selection techniques for choosing the most efficient solution under different rewrite plan alternatives.

In an embodiment, a universal substitution of a semi-join with an inner-join technique, herein referred to as the Post-Join Semi-Join Rewrite Technique, rewrites a semi-join into an inner-join with no limitation on join predicate P. The Post-Join Semi-Join Rewrite Technique removes duplicates that were introduced by the inner-join operation post the inner-join. A tuple identifier, that uniquely identifies a tuple, such as a row id or a primary key, is used ensure that every tuple that is left input (right input) to the left-semi-join (right-semi-join) are not be duplicated. A distinct operation is applied to the tuple identifier to remove duplicates after applying inner-join between the preserving table and the non-preserving table on join predicate P.

In an embodiment, a query optimization technique herein referred to as the Transformation-Based Query Optimization Technique, integrates the Pre-Join Semi-Join Rewrite Technique, the Semi-Join Substitution Technique, and the Post-Join Semi-Join Rewrite Technique. The Transformation-Based Query Optimization Technique rewrites a given query into an equivalent form. The rewrite is based on rewrite rules and cost. The Transformation-Based Query Optimization Technique takes a query as an input, goes through each set of rewrite rules to decide whether a rewrite could be applied to the query, compares the cost of each rewrite, and chooses the most efficient rewrite technique.

In another embodiment, a query optimization technique herein referred to as the Generative Query Optimization Technique, integrates the Pre-Join Semi-Join Rewrite Technique, the Semi-Join Substitution Technique, and the Post-Join Semi-Join Rewrite Technique. The Generative Query Optimization Technique consists of two phases of processing: a Cost-Based Rewrite and a Heuristic-Based Rewrite.

The Cost-Based Rewrite converts a query block into a semantically equivalent form. In the Cost-Based Rewrite, rewrites may be applied in a sequential manner; that is, each rewrite is applied on the entire query tree followed by another rewrite. Costs of rewrite techniques are compared one by one with the lower one chosen.

The Heuristic-Based Rewrite refines an already rewritten query from the Cost-Based Rewrite. The steps for the Heuristic-Based Rewrite are as follows:

(1) Detect a semi-join in the given query.
(2) Determine if the semi-join is a left semi-join or a right semi-join.
(3) Retrieve the lowest overall costs determined from the Cost-Based Rewrite phase.
(4) For each semi-join rewrite technique, determine if it is applicable based on join predicate. The Pre-Join Semi-Join Rewrite Technique is applicable if the join predicate only contains AND operations and logical comparison operations. The Semi-Join Substitution Technique is applicable if there are no duplicates in the inner relation T2 when projected on the attributes that are referenced in the join predicate. The Post-Join Semi-Join Technique is always applicable.
(5) If the Semi-Join Substitution Technique is applicable, apply the Semi-Join Substitution Technique on the given query. Then compare the cost of the rewrite with the lowest overall cost determined from the Cost-Based Rewrite phase and choose the cheaper one as the new rewrite to be applied.
(6) If the Semi-Join Substitution Technique is not applicable, but the Pre-Join Semi-Join Rewrite Technique or the Post-Join Semi-Join Rewrite Technique is applicable, then compare the cost of the Pre-Join Semi-Join Technique and the cost of the Post-Join Semi-Join Rewrite Technique and choose the cheaper one as the new rewrite to be applied.
(7) If the Post-Join Semi-Join Rewrite Technique is chosen, determine the tuple identifier of the preserving table of the semi-join.
(8) Apply the chosen rewrite technique.

NOTATIONS

In order to define the rewrites more systematically the following notions are introduced:

A(e) denotes the set of attributes/variables provided by some expression e.

F(e) denotes the set of free attributes/variables in some expression e.

$\ltimes_p$ denotes the left semi-join with predicate p that is null rejecting and is conjunctive. T1 $\ltimes_p$ T2 indicates that a left semi-join applied between the preserving table T1 and the non-preserving table T2 on attribute p.

$\bowtie_p$ denotes the inner semi-join with predicate p that is null rejecting and is conjunctive. T1 $\bowtie_p$ T2 indicates that an inner-join applied between the preserving table T1 and the non-preserving table T2 on attribute p.

$\Pi^D$ denotes duplicate eliminating projection.

○ denotes tuple concatenation.

∧ denotes AND relationship. The statement A∧B is true if A and B are true; if either is false, the statement is false.

∈ denotes set membership. A∈B denotes A is an element of set B.

∅ denotes empty set.

⊆ denotes subset. A⊆B denotes A subset set B.

∪ denotes union.

∩ denotes intersection.

$\exists_a$ denotes existential qualification, which asserts that the relation holds for at least a member "a" of the domain.

POST-JOIN SEMI-JOIN REWRITE TECHNIQUE

The Post-Join Semi-Join Rewrite Technique can be applied to rewrite a semi-join into an inner join. The rewrite can be expressed through the following equivalence:

$R_0 \ltimes_p R_1 = \Pi^D_{A(R0)}(R_0 \bowtie_p R_1)$ where $\exists_k \in k(R_0) | k \cap A(R_0) \neq \emptyset$ holds.

FIG. 1A is a block diagram illustrating the steps performed by a DBMS to perform the Post-Join Semi-Join Rewrite Technique, according to an embodiment.

At step 100, a DBMS receives a query comprising a semi-join. The DBMS may parse the given query to determine a portion of the query that comprises the semi-join and whether to perform the Post-Join Semi-Join Rewrite Technique.

Referring to FIG. 2, table 200 is referred to as a preserving table, with columns for "C1" (table200.C1) and "C2" (table200.C2). Table 210 is referred to as a non-preserving table, with column for "C1" (table210.C1) and "C2" (table210.C2).

Assume a DBMS receives the following query for table 200 and 210 that includes a semi-join:
SELECT*
FROM table_1 table200
   LEFT SEMI JOIN table_2 table210 on (table200.C1=table210.C1)

In the present example, the query comprises a left semi-join between the preserving table (table 200) and the non-preserving table (table 210) on join predicate table200.C1=table210.C1.

In the present example, the left semi join between table 200 and table 210 on attribute C1 could be rewritten into an inner-join.

Figure 3:
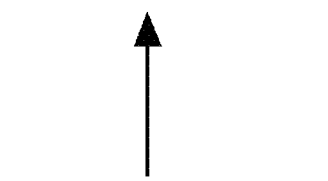
FIG. 3 depicts an example related to the Post-Join Semi-Join Rewrite Technique, which involves generating an identifier column.

At step 101, an identifier column is added to the preserving table. FIG. 3 illustrates adding an identifier column to table 200. Row ids could be used as identifiers in case the input relation is a base relation.

Figure 4:
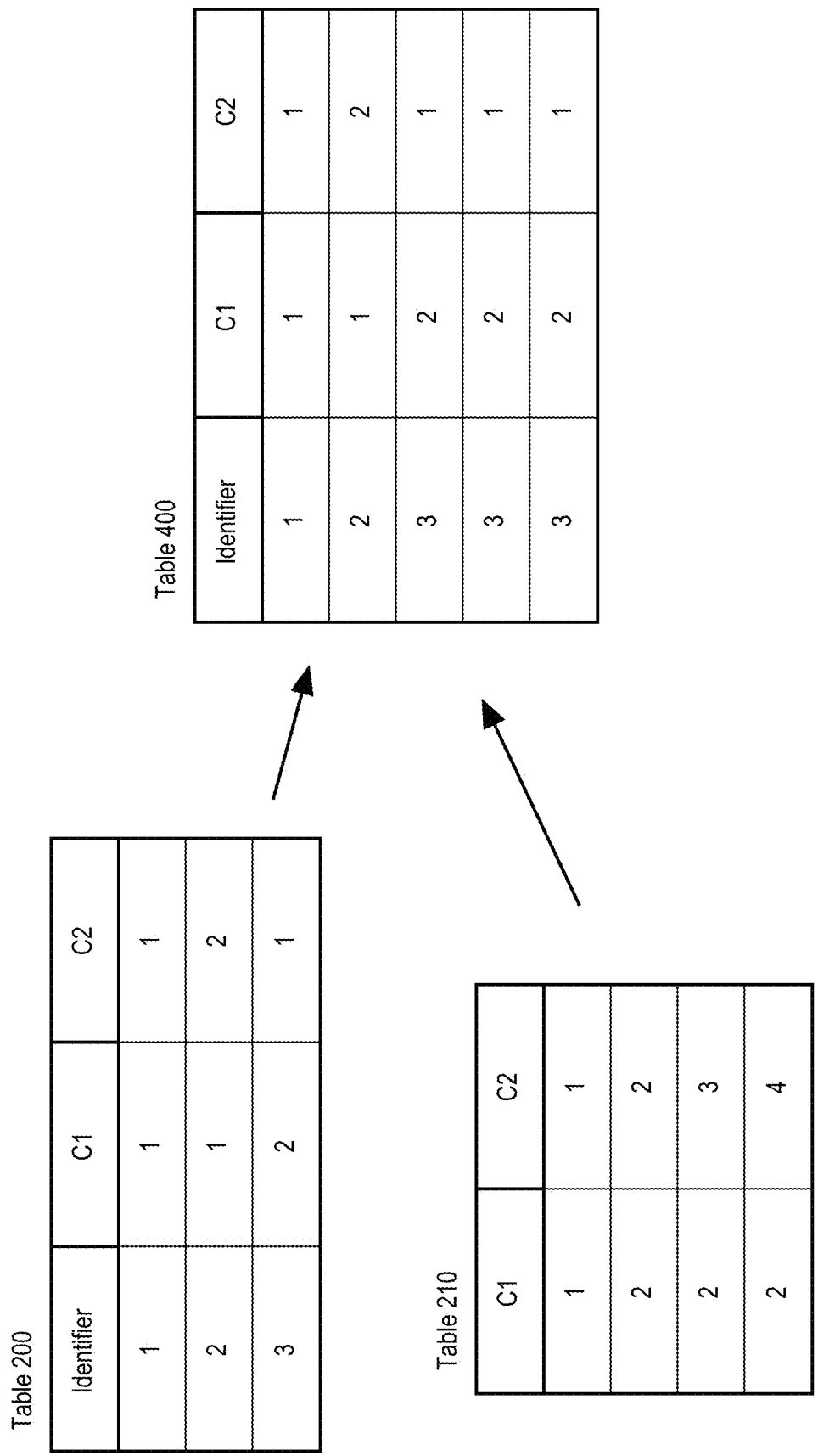
FIG. 4 depicts an example related to the Post-Join Semi-Join Rewrite Technique, which involves performing inner-join.

At step 102, an inner-join operation is applied between the preserving table and non-preserving table on the given join predicate. FIG. 4 illustrates the result of the inner-join operation for inner-join between table 200 and table 210 on attribute C1. Every row in table 200 is compared to every row of table 210 to find all pairs of rows which satisfy the join predicate table 200.C1=table 210.C1. The column value for each matched pair of rows are combined into a result row.

Figure 5:
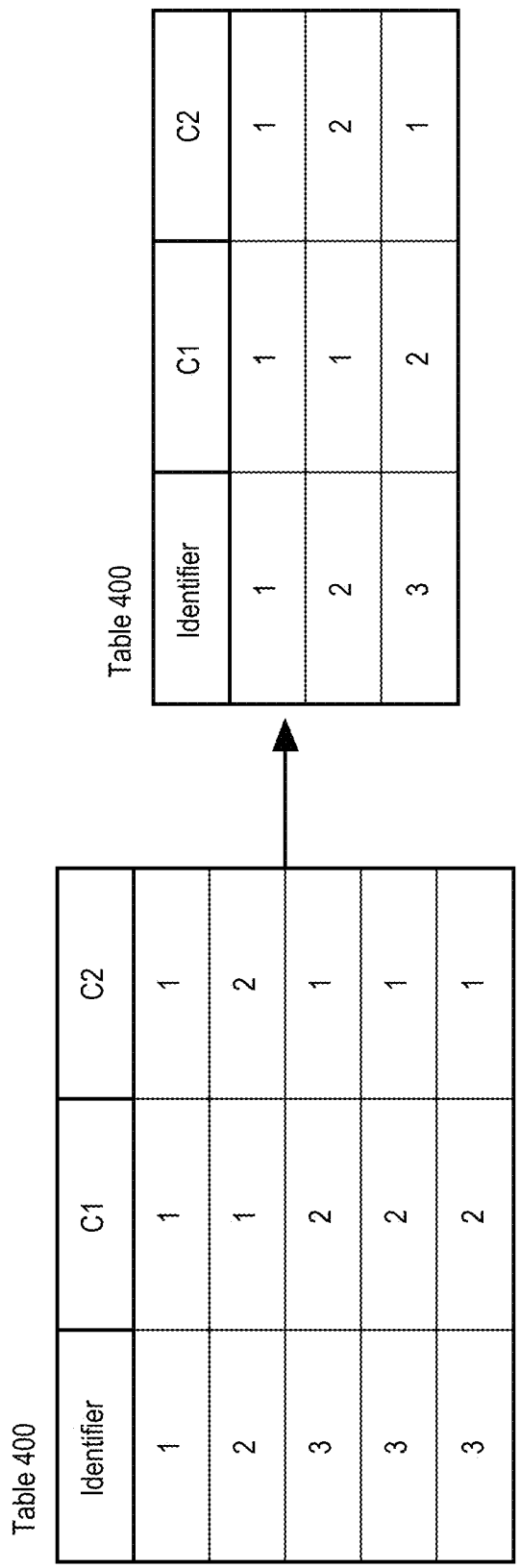
FIG. 5 depicts an example related to the Post-Join Semi-Join Rewrite Technique, which involves de-duplicating based on identifier column.

At step 103, a distinct operation is applied to the identifier column to remove duplicates. FIG. 5 illustrates the distinct operation result applied to the identifier column of table 400.

Figure 6:
FIG. 6 depicts an example related to the Post-Join Semi-Join Rewrite Technique, which involves removing the identifier column.

At step 104, the identifier column is dropped. FIG. 6 illustrates the result of dropping the identifier column of table 400.

Steps 100 through 104 rewrite a semi-join into an inner-join, where the result of the inner-join operations is equivalent to a left semi-join operation between the preserving table (table 200) and the non-preserving table (table 210) on join predicate table200.C1=table210.C1.

SEMI-JOIN SUBSTITUTION TECHNIQUE

The Semi-Join Substitution Technique can be applied to rewrite a semi-join into an inner join. The rewrite can be expressed through the following equivalence:

$R_0 \ltimes_P R_1 = \Pi^D_{A(R0)}(R_0 \bowtie_P R_1)$ where $\Pi^D_{F(P) \cap A(R1)}(R_1)$ holds.

Figure 1B:
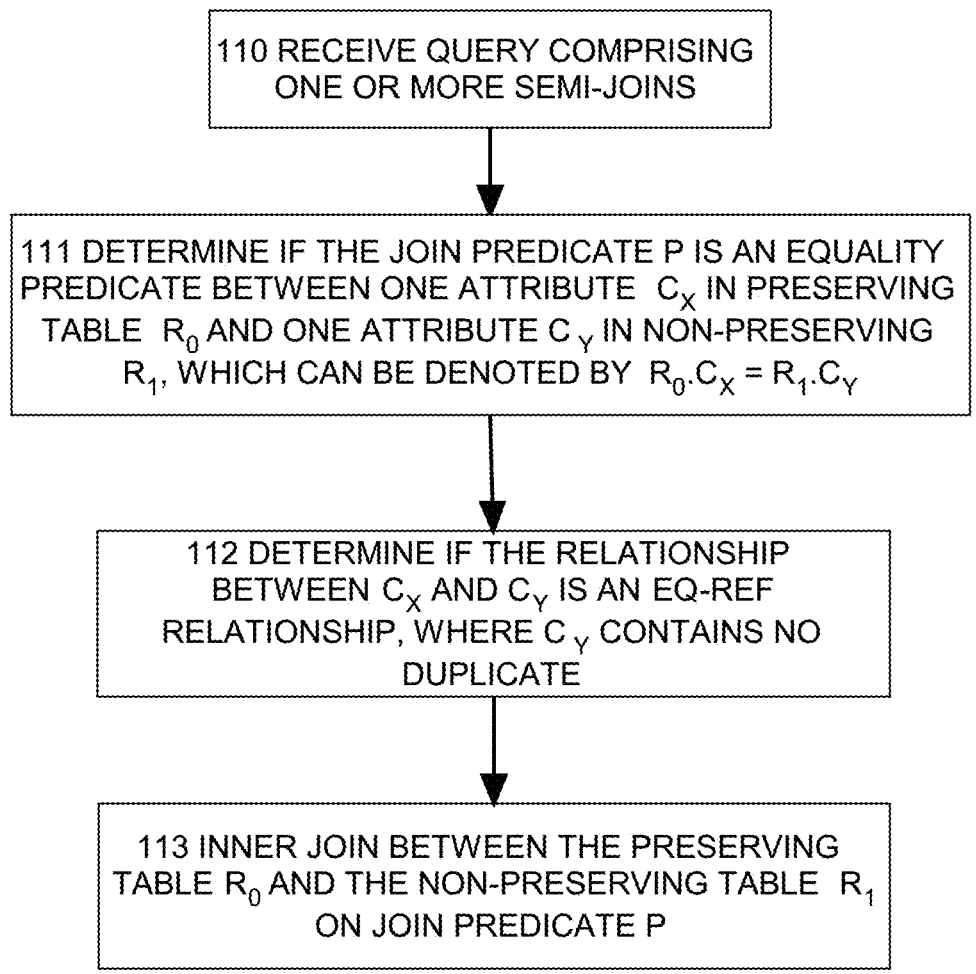
FIG. 1B is a block diagram illustrating the steps performed by a DBMS to perform the Semi-Join Substitution Technique.

FIG. 1B is a block diagram illustrating the steps performed by a DBMS to perform the Semi-Join Substitution Technique, according to an embodiment.

At step 110, a DBMS receives a query comprising a semi-join. The DBMS may parse the given query to determine a portion of the query that comprises the semi-join and whether to perform the Semi-Join Substitution Technique.

At step 111, a determination is made on whether the join predicate P is an equality predicate between on attribute $C_X$ in a preserving table $R_0$ and another attribute $C_Y$ in a non-preserving table $R_1$. For example, an equality join predicate for a left semi-join can be denoted as "$R_0.C_X=R_1.C_Y$," where "$C_X$" is any column of $R_0$ and "$C_Y$" is any column of $R_1$. Here, $R_0$ is the preserving table and $R_1$ is the non-preserving table.

If the join predicate P is an equality predicate, at step 112, a determination is made on whether the attribute $C_X$ in the preserving table $R_0$ contains duplicates. If the join predicate P is an equality predicate and the attribute $C_Y$ contains no duplicates, the semi-join is converted to an inner-join at step 113 by inner join between the preserving table $R_0$ and the non-preserving table $R_1$ on join predicate P.

Pre-Join Semi-Join Rewrite Technique

Figure 1C:
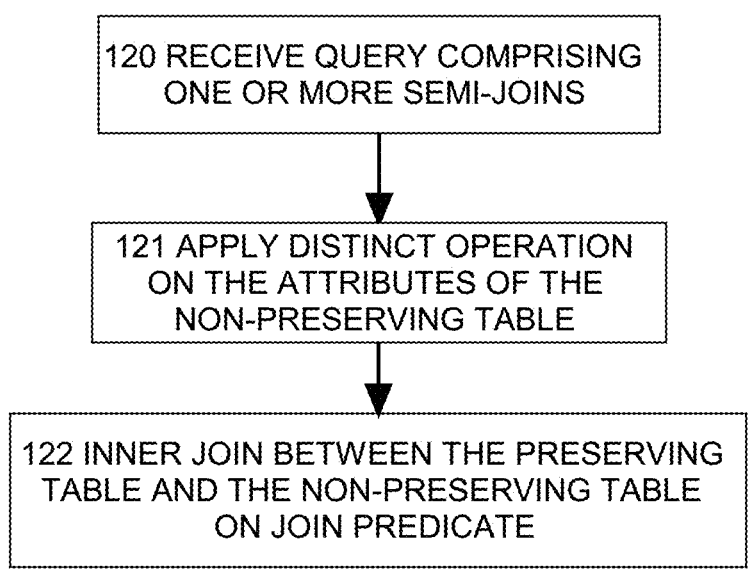
FIG. 1C is a block diagram illustrating the steps performed by a DBMS to perform the Pre-Join Semi-Join Rewrite Technique.

The Semi-Join Substitution Technique can be applied to rewrite a semi-join into an inner join. The rewrite can be expressed through the following equivalence:

$R_0 \ltimes_P R_1 = \Pi^D_{A(R0)}(R_0 \bowtie_P (\Pi^D_{F(P) \cap A(R1)}(R_1)))$ FIG. 1C is a block diagram illustrating the steps performed by a DBMS to perform the Pre-Join Semi-Join Rewrite Technique, according to an embodiment.

At step 120, a DBMS receives a query comprising a semi-join. The DBMS may parse the given query to determine a portion of the query that comprises the semi-join and perform the Pre-Join Semi-Join Rewrite Technique.

At step 121, a distinct operation is applied to the attributes of the non-preserving table $R_0$ that are referenced in join predicate P.

At step 122, the semi-join is converted to an inner-join by inner join between the preserving table $R_0$ and the non-preserving table $R_1$ on join predicate P.

Transformation-Based Query Optimization Technique

In an embodiment, a query optimization technique herein referred to as the Transformation-Based Query Optimization Technique, determines how to rewrite a query representation based at least in part on the rewrite rules of different rewrite techniques.

Figure 7:
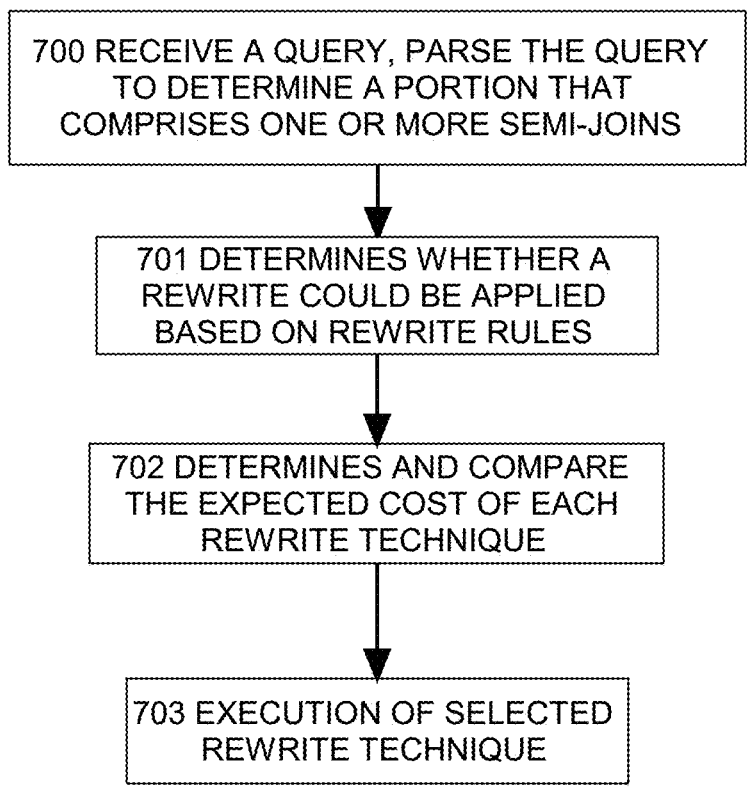
FIG. 7 is a block diagram illustrating the steps performed by a DBMS to process a Transformation-Based Query Optimization Technique.

FIG. 7 is a block diagram illustrating the steps performed by a DBMS to process a Transformation-Based Query Optimization Technique, according to an embodiment.

At step 700, a DBMS receives a query and parses the given query to determine whether the query comprises a semi-join.

At step 701, if the given query comprises a semi-join, the query processor determines whether a rewrite technique could be applied to the semi-join based on rewrite rules of different rewrite techniques. The Pre-Join Semi-Join Rewrite Technique is applicable if the join predicates only contain AND operations and logical comparison operations. The Semi-join Substitution Technique is applicable if there are no duplicates in the inner relation when projected on the attributes that are referenced in the join predicate. The Post-Join Semi-Join Rewrite Technique is always applicable.

At step 702, the expected cost of each applicable rewrite techniques is determined and compared. The cheapest rewrite technique is chosen and executed at step 703.

GENERATIVE QUERY OPTIMIZATION TECHNIQUE

In an embodiment, a query optimization technique herein referred to as the Generative Query Optimization Technique, determines how to rewrite a query representation based at least in part on the rewrite rules of different rewrite techniques and the costs of different rewrite techniques.

Figure 8:
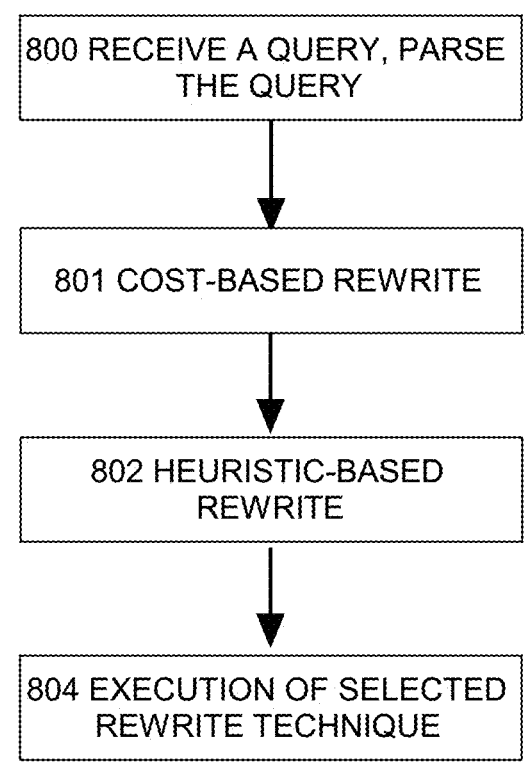
FIG. 8 is a block diagram illustrating the steps performed by a DBMS to process a Generative Query Optimization Technique.

FIG. 8 is a block diagram illustrating the steps performed by a DBMS to process the Generative Query Optimization Technique, according to an embodiment. At step 801, a DBMS receives a query. The DBMS may parse the given query to determine a portion of the query to perform the Generative Query Optimization Technique. The Generative Query Optimization Technique consists of two phases of processing: a Cost-Based Rewrite phase and a Heuristic-Based Rewrite phase. Referring to FIG. 8, the Cost-Based Rewrite is performed at step 801 and the Heuristic-Based Rewrite is performed at step 802.

Cost-Based Rewrite

Cost-Based Rewrite is a SQL query optimization technique that determines the most efficient query rewrite technique by considering available access paths and by factoring in information based on statistics for the schema objects (tables or indexes) accessed by the SQL statement. The Cost-Based Rewrite framework comprises the following steps:

(1) A set of potential rewrites technique for the SQL statement is generated based on its available access paths.

(2) The cost of each rewrite technique is estimated based on statistics and estimated computer resources.

(3) Costs of rewrite techniques are compared one by one and the one with the lower cost is chosen.

More specifically, the Cost-Based Rewrite applies different query rewrite techniques to rewrite the parsed query into a semantically equivalent form. Different rewrite techniques apply on different elements of a query tree. For example, unnesting and view merging apply on subqueries and views respectively; group-by placement applies on the node of a join graph; the join predicate pull-up rewrite applies on expensive join predicates.

Rewrite techniques are applied in sequential manner; that is, each rewrite technique may be applied in order by another rewrite technique. In one of the embodiments, the sequential order is the following: common sub-expression factorization, SPJ view merging, join elimination, subquery unnesting, semi-join rewrite techniques (includes Semi-Join Substitution Technique, Pre-Join Semi-Join Rewrite Technique, and Post-Join Semi-join Rewrite Technique), group-by (distinct) view merging, group pruning, join predicate move around, set operator into join conversion, group-by placement, join predicate pullup, join factorization, disjunction into union-all expansion, star transformation, and join predicate pushdown.

To apply the rewrite in a sequential manner, each rewrite is considered in sequential order against a current version of the query. To consider the rewrite, it is determined whether rewrite rules for the rewrite technique qualify the current version of the query for the rewrite. If the current version is qualified, the rewrite is applied; otherwise the next rewrite in the sequence is considered.

If the current version is found to be qualified, a candidate rewritten version of the query is generated. An execution cost estimation is determined for the candidate rewritten version and compared to the execution cost estimate of the current version of the query. If the execution of the candidate rewritten version is less or less by a certain threshold, the rewritten version is retained, that is, becomes the current version of the query. If not, then the current version of the query is retained. The subsequent rewrite in the sequence is considered for the current version of the query.

In an interleaved manner, multiple rewrites may be considered and applied to the current version of the query to generate a candidate rewritten query. An execution cost estimate of the candidate rewritten query, which reflects multiple rewrites, is then compared to the current version of the query.

The estimation of the execution cost of a rewrite technique may be based on storage characteristics of the tables, indexes, and partitions accessed by the statement. Estimation may also be based on the cost of access paths and join orders, which are based on the estimated computer resources, including I/O, CPU, and memory. If statistics are available for a given rewrite technique, statistics from the dictionary may be retrieved and be used to estimate the overall cost of the given rewrite technique.

In an embodiment, the Cost-Based Rewrites integrates semi-join rewrite techniques. Semi-join rewrite techniques include the Pre-Join Semi-Join Rewrite Technique, the Semi-Join Substitution Techniques, and the Post-Join Semi-Join Rewrite Technique. As mentioned above, the Semi-Join Rewrite Technique may be applied after subquery unnesting if the subquery unnesting step has introduced one or more semi-joins.

Figure 9:
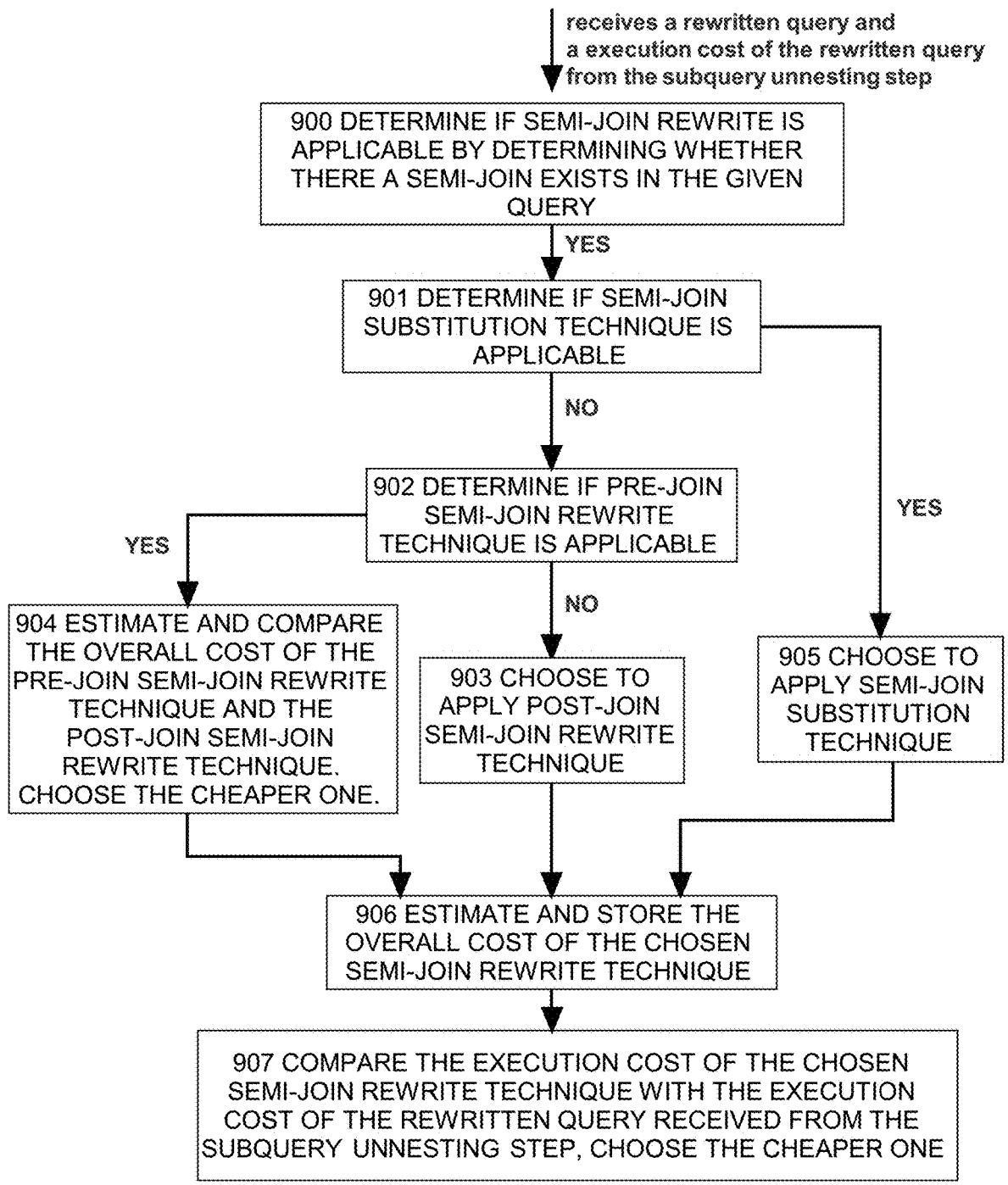
FIG. 9 is a block diagram illustrating the steps performed by a DBMS to apply semi-join rewrite techniques in a Cost-Based Rewrite.

FIG. 9 is a block diagram illustrating the steps performed by the Cost-Based Rewrite to rewrite a query, according to an embodiment.

At step 900, a determination is made on whether a semi-join rewrite technique is applicable to the rewritten query received from the subquery unnesting step. At least one Semi-Join Rewrite Technique is applicable when there exist one or more semi-joins in the given query.

At step 901, a determination is made on whether the Semi-Join Substitution Technique can be applied. The Semi-Join Substitution Technique can be applied if there are no duplicates in the inner relation when projected on the attributes that are referenced in join predicate. If the Semi-Join Substitution Technique is applicable, the Semi-Join Substitution Technique is chosen as the semi-join rewrite technique to be applied at step 905.

If the Semi-Join Substitution Technique is not applicable, at step 902, a determination is made on whether the Pre-Join Semi-Join Rewrite Technique can be applied. The Pre-Join Semi-Join Rewrite Technique is applicable if the join predicate only contains AND operations and logical comparison operations.

If the Pre-Join Semi-Join Rewrite Technique is applicable, at step 904, the overall cost of the Pre-Join Semi-Join Rewrite Technique and the overall cost of the Post-Join Semi-Join Rewrite Technique are estimated and compared. The cheaper one is chosen as the semi-join rewrite technique to be applied.

If the Pre-Join Semi-Join Rewrite Technique is not applicable, the Post-Join Semi-Join Rewrite is chosen as the semi-join rewrite technique to be applied at step 903.

At step 906, the overall cost of the chosen semi-join rewrite technique is estimated and stored as the execution cost of the candidate rewritten version of a given query.

At step 907, the execution cost of the candidate rewritten version of the given query is compared with the execution cost of the rewritten version of the given query received from the subquery unnesting step, and the cheaper one is chosen to be applied.

Heuristic-Based Rewrite

Heuristic-Based Rewrite is a SQL Query Optimization Technique that uses heuristic rules to derive optimal query rewrite. Heuristic-Based Rewrite refines an already rewritten version of a particular query from the Cost-Based Rewrite.

Figure 10:
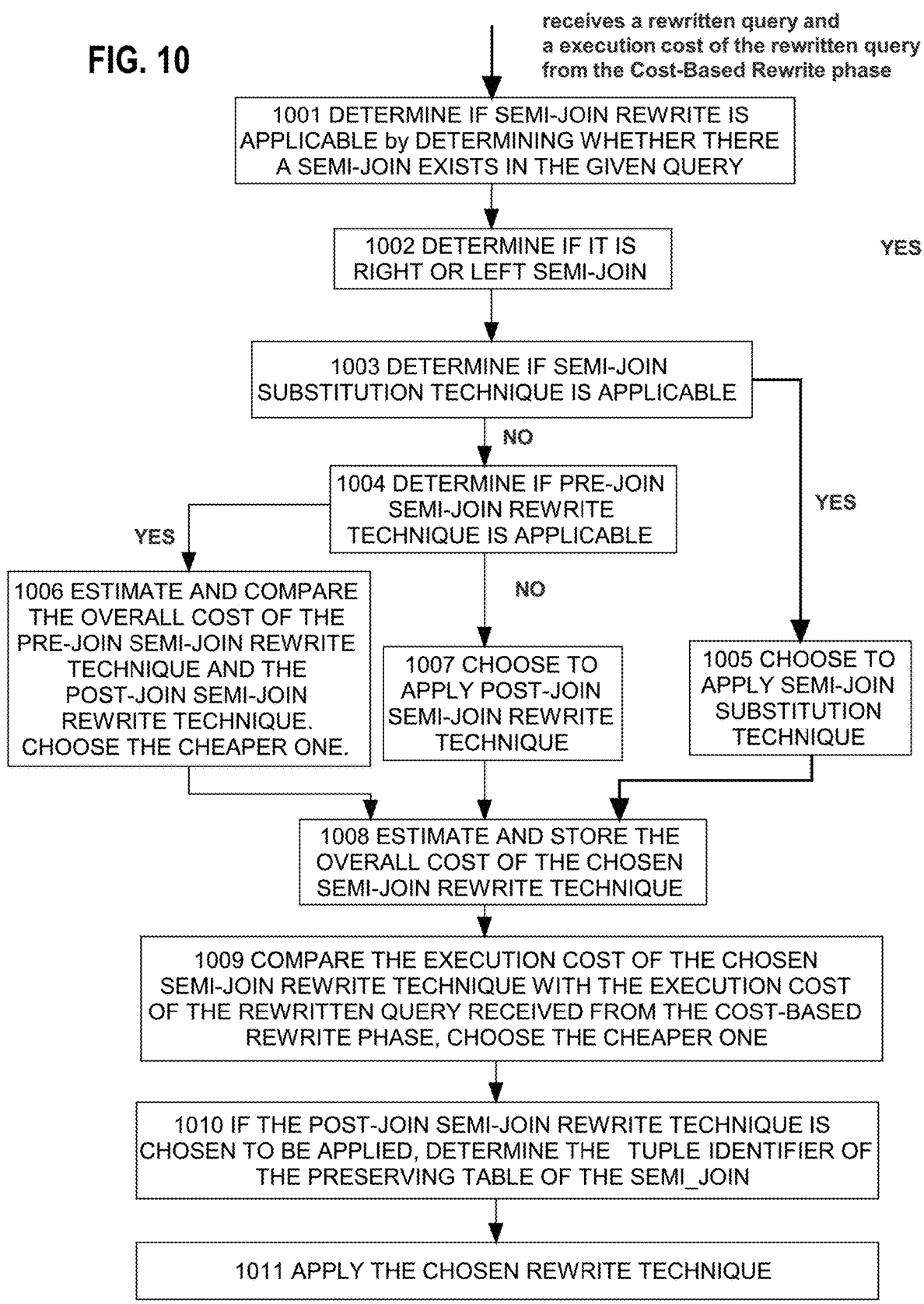
FIG. 10 is a block diagram illustrating the steps performed by a DBMS to apply semi-join rewrite techniques in a Heuristic-Based Rewrite.

FIG. 10 is a block diagram illustrating the steps performed by the Heuristic-Based Rewrite integrated with semi-join rewrite techniques, according to an embodiment.

At step 1001, a determination is made on whether a semi-join rewrite technique is applicable to the rewritten query received from the Cost-Based Rewrite phase. At least one semi-join rewrite technique is applicable when there exist one or more semi-joins in the given query.

If a semi-join rewrite technique is applicable, at step 1002, a determination is made on whether the detected semi-join is a left semi-join or a right semi-join.

At step 1003, a determination is made on whether the Semi-Join Substitution Technique can be applied. The Semi-Join Substitution Technique can be applied if there are no duplicates in the inner relation when projected on the attributes that are referenced in join predicate. If the Semi-Join Substitution Technique is applicable, the Semi-Join Substitution Technique is chosen as the semi-join rewrite technique to be applied at step 1005.

If the Semi-Join Substitution Technique is not applicable, at step 1004, a determination is made on whether the Pre-Join Semi-Join Rewrite Technique can be applied. The Pre-Join Semi-Join Rewrite Technique is applicable if the join predicate only contains AND operations and logical comparison operations.

If the Pre-Join Semi-Join Rewrite Technique is applicable, at step 1006, the overall cost of the Pre-Join Semi-Join Rewrite Technique and the overall cost of the Post-Join Semi-Join Rewrite technique are estimated and compared. The cheaper one is chosen as the semi-join rewrite technique to be applied.

If the Pre-Join Semi-Join Rewrite Technique is not applicable, the Post-Join Semi-Join Rewrite Technique is chosen as the semi-join rewrite technique to be applied at step 1007.

At step 1008, the overall cost of the chosen semi-join rewrite technique is estimated and stored as the execution cost of the candidate rewritten version of a given query.

At step 1009, the execution cost of the candidate rewritten version of the given query is compared with the execution cost of the rewritten version of the given query received from the Cost-Based Rewrite phase, and the cheaper rewrite technique is chosen to be applied.

At step 1010, if the Post-Join Semi-Join Rewrite Technique is chosen to be applied, determine the tuple identifier of the preserving table of the semi-join. The chosen rewrite technique is applied at step 1011.

DATABASE OVERVIEW

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

SOFTWARE OVERVIEW

Figure 11:
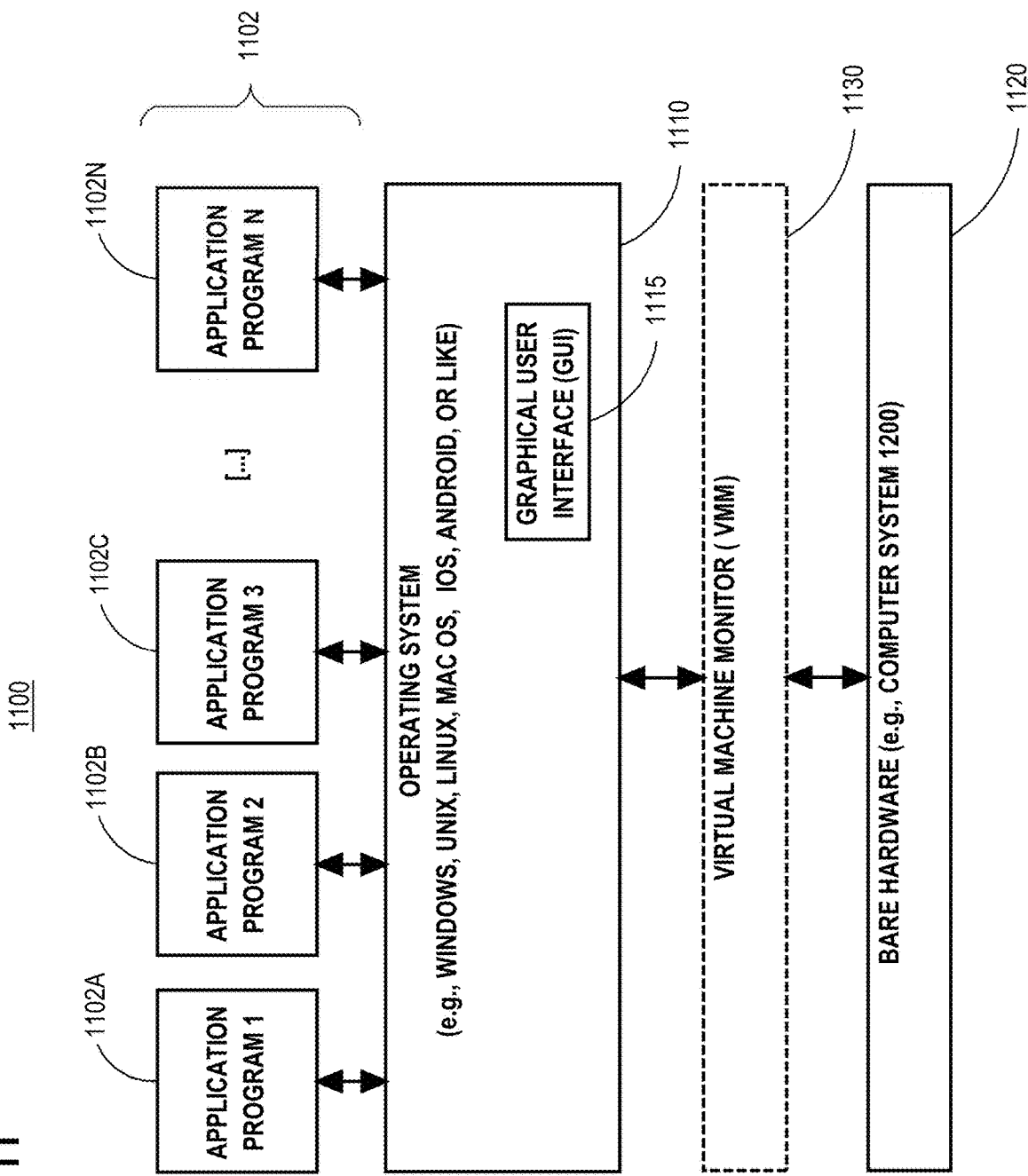
FIG. 11 is a block diagram of a basic software system that may be employed for controlling the operation of computing system 1200 according to an embodiment.
Figure 12:
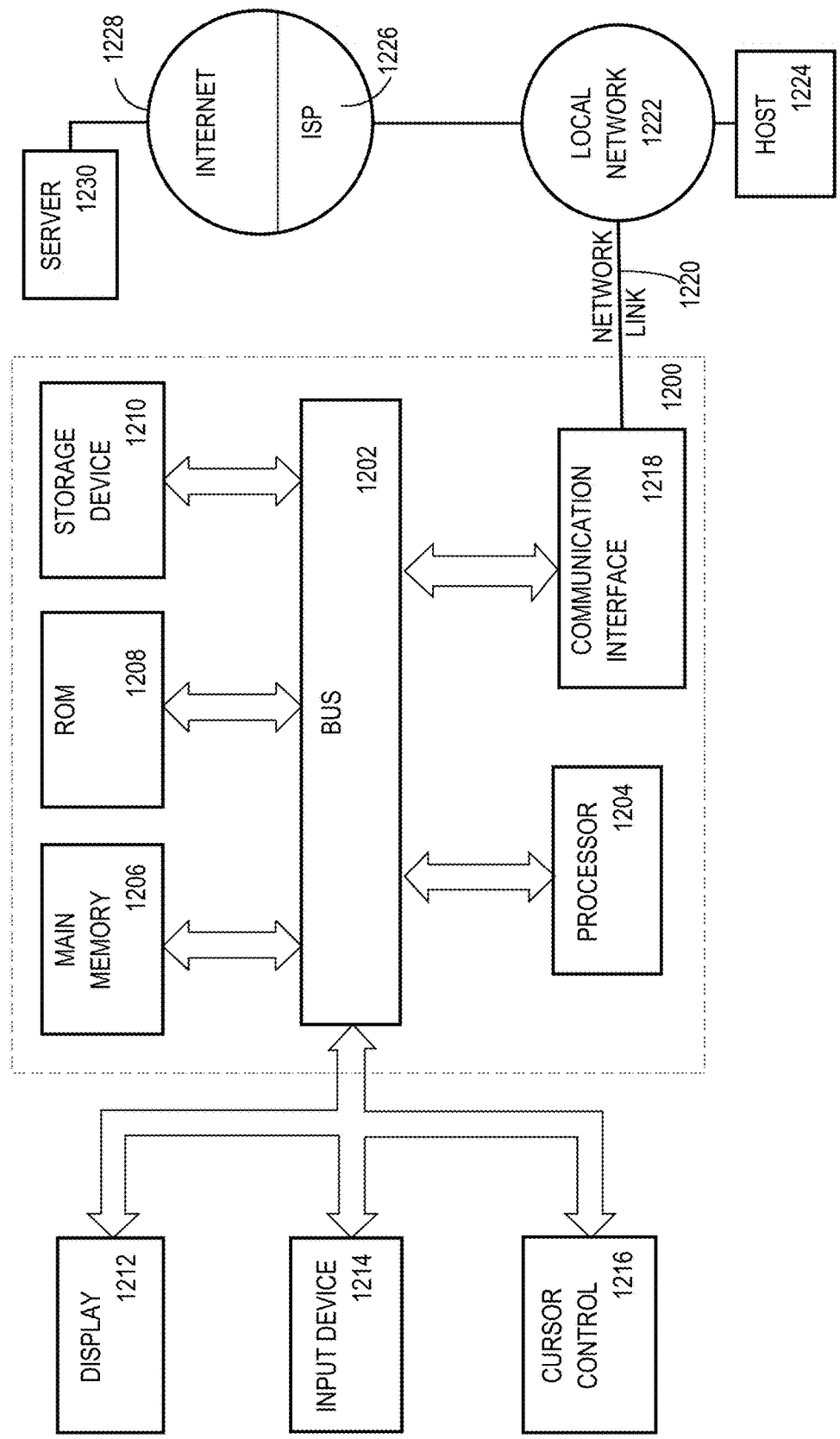
FIG. 12 depicts a computer system upon which an embodiment may be implemented according to an embodiment.

FIG. 11 is a block diagram of a basic software system 1100 that may be employed for controlling the operation of computing system 1200 of FIG. 12. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing system 1200. Software system 1100, which may be stored in system memory (RAM) 1206 and on fixed storage (e.g., hard disk or flash memory) 1210, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1210 into memory 1206) for execution by the system 1100. The applications or other software intended for use on computer system 1200 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1204) of computer system 1200. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1200.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1200 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

CLOUD COMPUTING

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1310 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1304 as it is received, and/or stored in storage device 1210, or other non-volatile storage for later execution.

What is claimed is:

1. A method of transforming a certain query, comprising:
    determining to apply a rewrite technique to a query that specifies a semi-join based on a join predicate between a first relation that is not a base relation and a second relation, said first relation being preserving with respect to said semi-join and said second relation being non-preserving with respect to said semi-join, said query not specifying any projection of a unique identifier column of said first relation; and
    applying said rewrite technique to generate a rewritten query that:
        projects said unique identifier column for each tuple in the first relation to an inner query block of said rewritten query;
        replaces the semi-join with an inner join based on the join predicate;
        specifies an operator that eliminates duplicates of rows generated by the inner join that have a duplicate unique identifier in said unique identifier column.

2. The method of claim 1, wherein projects a unique identifier column for each tuple in the first relation includes projects an added identifier column to said first relation.

3. The method of claim 1, wherein said second relation is intermediate result, wherein the method further includes applying another rewrite technique that specifies how to form unique identifiers for said unique identifier column.

4. A method of transforming a query, comprising:
    determining whether to apply each rewrite technique of a plurality of rewrite techniques to a particular version of said query;
    wherein said query specifies a particular semi-join based on a join predicate between a first relation that is not a base relation and a second relation, said first relation being preserved with respect to said particular semi-join and said second relation being none preserving with respect to said particular semi-join;
    wherein said plurality of rewrite techniques include a plurality of semi-join rewrite techniques that include:
        post-join semi-join rewrite that generates a rewritten version of said query that:
            replaces the particular semi-join with an inner join based on the join predicate,
            projects a unique identifier column for each tuple in the second relation,
            specifies an operator that eliminates duplicates of rows generated by the inner join that have duplicate unique identifier in unique identifier column; and
        semi-join substitution that generates a rewritten version of said query that replaces the particular semi-join with an inner join based on the join predicate when the join predicate on the second relation references on a column in a second table that contains no duplicate values; and
    determining whether to apply each rewrite technique of a plurality of rewrite techniques includes determining to apply one semi-join rewrite techniques of said plurality of semi-join rewrite techniques to rewrite to said particular version of said query thereby replacing said particular semi-join with a replacement inner join.

5. The method of claim 4, wherein said plurality of semi-join rewrite techniques further includes:
    pre-join semi-join rewrite that generates a rewritten version of said query that replaces the particular semi-join with an inner join after applying distinct operation on a column in a second table that is referenced in the join predicate.

6. The method of claim 4, wherein determining to apply one semi-join rewrite techniques to rewrite to said particular version of said query includes:
    generating a plurality of rewritten queries by, for each semi-join rewrite technique of said plurality of semi-join rewrite techniques, applying said each semi-join rewrite technique to a same particular version of said query to generate a respective rewritten query of said plurality of rewritten queries that corresponds to said each semi-join rewrite technique;
    generating a respective execution cost for each rewritten query of said plurality of rewritten queries; and
    selecting a rewritten query of said plurality of rewritten queries that has a lowest respective execution cost.

7. The method of claim 4, determining whether to apply each rewrite technique of a plurality of rewrite techniques includes:
    applying each rewrite technique of said plurality of rewrite techniques to said particular version of the query to generate a candidate rewritten version of said query;
    comparing an execution cost of said candidate rewritten version of said query to an execution cost of said particular version of the query; and
    determining whether to retain said candidate rewritten version of said query or said particular version of the query based said comparing.

8. The method of claim 7, wherein said plurality of rewrite techniques includes a first rewrite technique that does not belong to said plurality of semi-join rewrite techniques, wherein determining to apply one semi-join rewrite techniques of said plurality of semi-join rewrite techniques occurs after determining whether to apply said first rewrite technique.

9. The method of claim 8, wherein said plurality of rewrite techniques includes a second rewrite technique that does not belong to said plurality of semi-join rewrite techniques, wherein determining to apply one semi-join rewrite techniques of said plurality of semi-join rewrite techniques occurs before determining whether to apply said second rewrite technique.

10. One or more non-transitory computer-readable storage medium storing instructions that, when executed by one or more processors, cause the one or more processors to perform functions comprising:
   determining to apply a rewrite technique to a query that specifies a semi-join based on a join predicate between a first relation that is not a base relation and a second relation, said first relation being preserving with respect to said semi-join and said second relation being non-preserving with respect to said semi-join, said query not specifying any projection of a unique identifier column of said first relation; and
   applying said rewrite technique to generate a rewritten query that:
      projects said unique identifier column for each tuple in the first relation to an inner query block of said rewritten query;
      replaces the semi-join with an inner join based on the join predicate;
      specifies an operator that eliminates duplicates of rows generated by the inner join that have a duplicate unique identifier in said unique identifier column.

11. The one or more non-transitory computer-readable storage medium of claim 10, wherein projects a unique identifier column for each tuple in the first relation includes projects an added identifier column to said first relation.

12. The one or more non-transitory computer-readable storage medium of claim 10, wherein said second relation is intermediate result, wherein when executed by one or more processors further causes applying another rewrite technique that specifies how to form unique identifiers for said unique identifier column.

13. One or more non-transitory computer-readable storage medium storing instructions that, when executed by one or more processors, cause the one or more processors to perform functions comprising:
   determining whether to apply each rewrite technique of a plurality of rewrite techniques to a particular version of said query;
   wherein said query specifies a particular semi-join based on a join predicate between a first relation that is not a base relation and a second relation, said first relation being preserved with respect to said particular semi-join and said second relation being none preserving with respect to said particular semi-join;
   wherein said plurality of rewrite techniques include a plurality of semi-join rewrite techniques that include:
      post-join semi-join rewrite that generates a rewritten version of said query that:
         replaces the particular semi-join with an inner join based on the join predicate,
         projects a unique identifier column for each tuple in the second relation,
         specifies an operator that eliminates duplicates of rows generated by the inner join that have duplicate unique identifier in unique identifier column; and
      semi-join substitution that generates a rewritten version of said query that replaces the particular semi-join with an inner join based on the join predicate when the join predicate on the second relation references on a column in a second table that contains no duplicate values; and
   determining whether to apply each rewrite technique of a plurality of rewrite techniques includes determining to apply one semi-join rewrite techniques of said plurality of semi-join rewrite techniques to rewrite to said particular version of said query thereby replacing said particular semi-join with a replacement inner join.

14. The one or more non-transitory computer-readable storage medium of claim 13, wherein said plurality of semi-join rewrite techniques further includes:
   pre-join semi-join rewrite that generates a rewritten version of said query that replaces the particular semi-join with an inner join after applying a distinct operation on a column in a second table that is referenced in the join predicate.

15. The one or more non-transitory computer-readable storage medium of claim 13, wherein determining to apply one semi-join rewrite techniques to rewrite to said particular version of said query includes:
   generating a plurality of rewritten queries by, for each semi-join rewrite technique of said plurality of semi-join rewrite techniques, applying said each semi-join rewrite technique to a same particular version of said query to generate a respective rewritten query of said plurality of rewritten queries that corresponds to said each semi-join rewrite technique;
   generating a respective execution cost for each rewritten query of said plurality of rewritten queries;
   selecting a rewritten query of said plurality of rewritten queries that has a lowest respective execution cost.

16. The one or more non-transitory computer-readable storage medium of claim 13, determining whether to apply each rewrite technique of a plurality of rewrite techniques includes:
   applying each rewrite technique of said plurality of rewrite techniques to said particular version of the query to generate a candidate rewritten version of said query;
   comparing an execution cost of said candidate rewritten version of said query to an execution cost of said particular version of the query; and
   determining whether to retain said candidate rewritten version of said query or said particular version of the query based said comparing.

17. The one or more non-transitory computer-readable storage medium of claim 16, wherein said plurality of rewrite techniques includes a first rewrite technique that does not belong to said plurality of semi-join rewrite techniques, wherein determining to apply one semi-join rewrite techniques of said plurality of semi-join rewrite techniques occurs after determining whether to apply said first rewrite technique.

18. The one or more non-transitory computer-readable storage medium of claim 17, wherein said plurality of rewrite techniques includes a second rewrite technique that does not belong to said plurality of semi-join rewrite techniques, wherein determining to apply one semi-join rewrite techniques of said plurality of semi-join rewrite techniques occurs before determining whether to apply said second rewrite technique.

\* \* \* \* \*